United States Patent [19]
Patrick et al.

[11] 3,743,463
[45] July 3, 1973

[54] MOLD CONSTRUCTION HAVING THERMAL BAFFLE FOR MOLDING ARTICLES WITHOUT DISTORTION SUCH AS PLASTIC PRINTING PLATES AND THE LIKE

[75] Inventors: Richard B. Patrick, Bernardsville; John Sonia, Califon, both of N.J.

[73] Assignees: Union Carbide Corporation, New York, N.Y.; Sun Graphic Systems, Inc., Addison, Ill. ; part interest to each

[22] Filed: Sept. 21, 1970

[21] Appl. No.: 74,020

[52] U.S. Cl. ................ 425/195, 425/394, 425/384
[51] Int. Cl. ............................ B29c 3/02, B29f 5/00
[58] Field of Search ................ 18/16 R, 16.5, 17 R, 18/17 H, 44, 5 R, 38, 47 R

[56] References Cited
UNITED STATES PATENTS

| | | | |
|---|---|---|---|
| 3,446,879 | 5/1969 | Atkin | 18/16 R X |
| 3,541,642 | 11/1970 | Bernardi et al. | 18/17 H |
| 3,145,654 | 8/1964 | Johnson et al. | 18/16 R UX |
| 3,522,633 | 8/1970 | Cubitt | 18/44 X |
| 3,474,498 | 10/1969 | Hoppes | 18/44 X |
| 3,534,440 | 10/1970 | Robberts | 18/44 UX |
| 2,907,070 | 10/1959 | Van Hartesveldt | 18/38 UX |
| 3,422,168 | 1/1969 | Bowser | 18/47 R X |

Primary Examiner—J. Howard Flint, Jr.
Attorney—Cynthia Berlow

[57] ABSTRACT

Water cooled metal mold halves have a plastic material matrix selectively removably clamped on one mold half and a plastic material thermal baffle adhesively secured to the other mold half with hot fluid plastic during molding thereof being positioned between the matrix and thermal baffle backed by the respective mold halves followed by cooling to a final self-supporting form prior to removal resulting in an article such as a plastic printing plate. In order to provide generally equal heat transfer from the hot fluid plastic being molded and thereby prevent distortion of the various configurations on the final plastic printing plate being molded, the matrix and thermal baffle are preferably formed of the same plastic material and a generally uniform thickness of the thermal baffle is generally equal to an average thickness of the matrix, the matrix necessarily varying in thickness due to the various configurations to be imparted to the final plastic printing plate to be molded.

10 Claims, 3 Drawing Figures

PATENTED JUL 3 1973　　　　　　　　　　　3,743,463

INVENTOR.
RICHARD B. PATRICK
JOHN SONIA
BY MAHONEY, HORNBAKER
AND SCHICK
ATTORNEYS

MOLD CONSTRUCTION HAVING THERMAL BAFFLE FOR MOLDING ARTICLES WITHOUT DISTORTION SUCH AS PLASTIC PRINTING PLATES AND THE LIKE

BACKGROUND OF THE INVENTION

This invention relates to a mold construction having a novel thermal baffle concept and more particularly, to such a mold construction for use in molding articles without distortion such as plastic printing plates and the like wherein a unique thermal baffle is provided permitting use of a matrix formed of a material having a rate of heat transfer below that of the material from which the mold halves are formed while still producing finally molded plastic printing plastes having sharp, undistorted configurations thereon required for later high quality printing during printing plate use. Furthermore, according to the principles of the novel mold construction of the present invention, molded articles such as plastic printing plates are provided having extremely high resolution and fidelity as required in high quality printing, yet the plastic printing plates may be produced at much higher speeds in lower temperature molds and by use of either pressure molding or injection molding processes.

One of the relatively recent advances in the printing trades, particularly useful where a large number of copies of printed matter are required, such as, for instance, various forms of publications, is the use of plastic printing plates. Obviously, with the use of plastic printing plates, the materials required therefor are of reduced expense and easier of formation, assuming the required printing plate resolution and fidelity can be obtained required for printing, than have been the purely metal plates heretofore used. Although an original metal plate pattern is required, multiple, durable metal printing plates are not required to be produced therefrom, but rather a reverse form of pattern plate is used for producing multiple plastic matrix plates, each of which is used in a mold for forming multiple plastic printing plates.

In the production of plastic printing plates, if the full advantages of this form of printing procedure are to be gained, speed of production is an extremely important criteria. At the same time, however, due to the inherent physical characteristics of plastics and the molding thereof, the speed of molding of the plastic printing plates must be limited to a time factor whereby maximum resolution and fidelity of printing character on the printing plate must be maintained at least of equal quality to the prior metal printing plates. Thus, one of the major problems in the production of plastic printing plates has been the matching of the time element of plastic printing plate production against the quality of the plastic printing plates so produced.

According to the prior procedures, once the plastic matrix plates have been produced, a matrix is mounted on the flat surface of a metal mold half and a charge of hot fluid plastic is inserted between the molding surface of the matrix and the flat surface of the other mold half so that with proper pressure and cooling, a plastic printing plate can be produced having the proper printing copy thereon as formed by the required configuration of the particular matrix. One of the most important factors to be considered in such molding of plastic printing plates, whether the molding is by straight pressure molding or by conventional injection molding, is the cooling of the plastic printing plate once the molded configuration has been accomplished and prior to removal thereof from the mold, the plastic printing plate being required, of course, to be cooled to a solid, self-supporting form in order that distortions thereof will not take place merely from movement of the finished plate. Furthermore, this cooling of the molded plastic printing plate must be uniform throughout the plate since due to the inherent characteristics of plastics and many other molding materials, unless the cooling is uniform from both sides of the plate, the resulting finally cooled plate will have distortions in the character configurations thereon and will not have the required high resolution and fidelity of the characters required for high quality printing during use of the plastic printing plate thereafter.

For instance, it is fundamental that in a final plastic printing plate there are a series of raised characters on the plate printing surface which accomplished the printing in use of the printing plate and these characters, whether numbers or letters or pictorial representations or whatever, must extend from the plate a uniform exact distance. Also, where a character raised surface is of any width, this raised surface must be exactly flat where a solid printed surface is to be obtained and any slight increased shrinkage of the plastic printing plate intermediate such printing surface as compared to the edges thereof will create a concave surface or "sink" so that the solid printed surface will not result as intended. Although this is merely one example of the results of uneven printing plate or other similar molded acticle cooling during molding, it does sufficiently illustrate the importance and criticality of properly contolled cooling.

In the prior procedures for producing plastic printing plates, in view of the plastic matrix mounted on the one metal mold half, uneven cooling of the plastic printing plates being molded will take place unless some means is provided for controlling the rate of cooling of the opposite metal mold half for the reaons that the plastic matrix has a relatively low rate of heat transfer therethrough even though backed by a metal mold half, whereas the backside of the plastic printing plate being molded is directly against the opposite metal mold half having the higher rate of heat transfer. In other words, with the two metal mold halves having a relatively high rate of heat transfer and with the plastic matrix having a low rate of heat transfer shielding one of these metal mold halves, cooling of the plastic printing plate being molded is at a slow rate on the matrix side and at a fast rate at the opposite metal mold side. It, therefore, has been necessary, in order to produce high quality plastic printing plates, to compensate for this varying rate of heat transfer.

Even further heat transfer problems in addition to those generally outlined in the foregoing can be encountered in the use of compression molding wherein an initial slug or charge of heated plastic is deposited centrally on the one metal mold half upon which the matrix is secured, such change being relatively thick and of greatly reduced area from that of the final printing plate. When this relatively large mass of heated plastic is thusly deposited, it possesses a large total heat content and transmits heat to the contact area at a rapid rate, thereby warming the point of contact. Upon the other metal half being closed with the matrix mounting mold half producing the required compression, the initial mass spreads over the matrix to become a thinner layer of less total heat content per unit area of contact than the original mass. The "warming effect" on the outermost perimeter of the matrix is consequently, due to this initial rapid heat transfer, much less than that at the center of the initial deposit. At the same time, the heat losses into the exposed other metal mold half now contacting and spreading the initial heated plastic mass are even greater, and the combination of conditions under extreme effects can cause case hardening of the final plastic printing plate, that is, a pliable center plate with brittle edges.

Attempts have been made at reducing these uneven heat transfer effects by following the molding procedure of first heating the metal mold halves, then introducing the charge of hot fluid plastic for forming the final plastic printing plate, and then cooling the matrix containing mold half at a faster rate than that mold half directly in contact with the plastic printing plate being molded in an attempt to even the cooling from the opposite sides of the plastic printing plate being molded and thereby approach the necessary quality of printing plates therefrom. Not only does this relatively complicated procedure require increased time for heating of the metal halves in the production of each single plastic printing plate, but it is obvious that the cooling control thereof is relatively complex and difficult of obtaining the required accuracy of cooling resulting in an impossibility of true control and printing plates of inferior quality.

Objects and Summary of the Invention

It is, therefore, an object of this invention to provide a mold construction having a unique thermal baffle for molding articles such as plastic printing plates and the like wherein high quality plastic articles such as printing plates are produced at a much higher production rate than has heretofore been possible, yet requiring far less critical cooling rate control of the molds during the molding processes. According to certain of the principles of the present invention, a unique thermal baffle is applied to the molding surface of the metal mold half opposite from that mold half mounting the plastic matrix so that the rate of heat transfer from the hot fluid plastic from which the plastic printing plate is being molded is virtually equalized into each of the metal mold halves having the higher rate of heat transfer. Thus, the rate of heat dissipation from the plastic printing plate being molded during such molding and during the cooling and rigid solidifying thereof is substantially equal in both mold half directions so as to eliminate problems of final plastic printing plate distortion which could effect the quality of printing obtained in use of the plastic printing plates so produced.

It is a further object of this invention to provide a mold construction of the foregoing character wherein the articles such as plastic printing plates produced having higher resolution and fidelity of printing plate character than plastic printing plates previously produced resulting in the capability of use of such plastic printing plates for the production of maximum quality of printing. With the plastic matrix covering one metal mold half surface and the thermal baffle convering the other metal mold half surface, when the charge of hot fluid plastic is inserted between the mold halves, the rate of heat dissipation from the charge of hot fluid plastic to form the plastic printing plate can be easily controlled so as to be initially relatively slow and increased only when the metal mold halves are deliberately and controllably cooled. In this manner, an initaial phase of heat containment can be deliberating carried out permitting the charge of plastic a greater period of time in its original hot fluid state to flow completely throughout the mold surface forming plastic matrix, followed by deliberate cooling only after the desired flow has been completed, thereby resulting in a higher resoltuion and fidelity of, in this case, printing plate character, than has heretofore been possible, yet at an overall decreased period of molding time.

It is still a further object of this invention to provide a mold construction having all the stated advantages wherein, according to certain of the principles of the present invention, the heating of the metal molds according to the previous practices can be completely eliminated with only the final cooling of the metal mold halves being required. Again, with the plastic matrix greatly reducing heat flow into the metal mold halve associated therewith and the thermal baffle likewise creating an equal heat flow reduction into the other mold half, the original heat in the hot fluid plastic is retained for a great period of time sufficient that proper flow during molding is obtained and this heat dissipation is only increased for final plastic printing plate solidification when intended by application of cooling means to the opposite metal mold halves. Thus, heating of the metal mold halves is not required for either the evening of heat dissipation or the reduction in time of heat dissipation to permit proper flow of the hot fluid plastic charge throughout the matrix molding surfaces.

It is still an additional object of this invention to provide a mold construction which satisfies all of the foregoing objects, yet is perfectly adaptable to either common pressure molding or common injection molding. In the case of pressure molding, the hot fluid plastic for forming the article such as the plastic printing plate is merely deposited between separated mold halves in the usual manner with the molding process taking place as described upon closure of the mold, and in an injection molding, the hot fluid plastic is merely introduced into the mold under pressure in the usual manner. Thus, the mold construction of the present invention are completely versatile and do not require radical changes from previous molding procedures.

Other objects and advantages of the invention will be apparent from the following specification and the accompanying drawing which are for the purpose of illustration only.

DESCRIPTION OF THE BEST EMBODIMENT CONTEMPLATED

Figure 1:
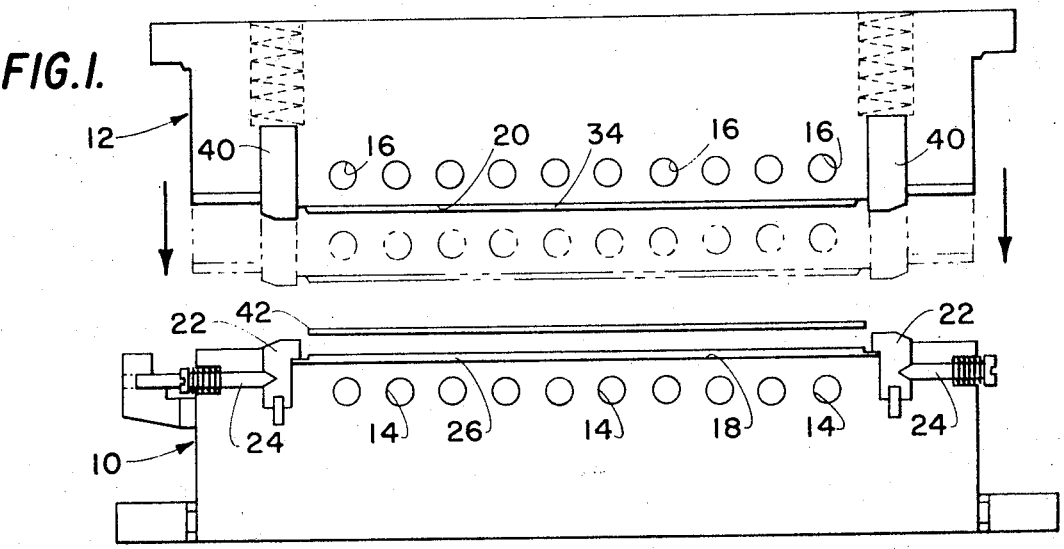
FIG. 1 is a side elevational view of an embodiment of plastic printing plate mold construction incorporating the principles of the present invention, mold halves thereof being separated.
Figure 2:
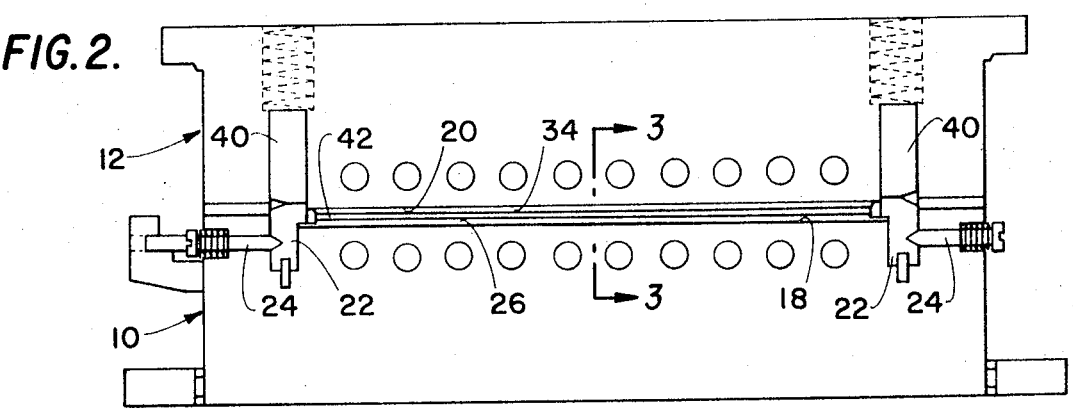
FIG. 2 is a side elevational view similar to FIG. 1, but with the mold halves closed in plastic printing plate molding position.
Figure 3:
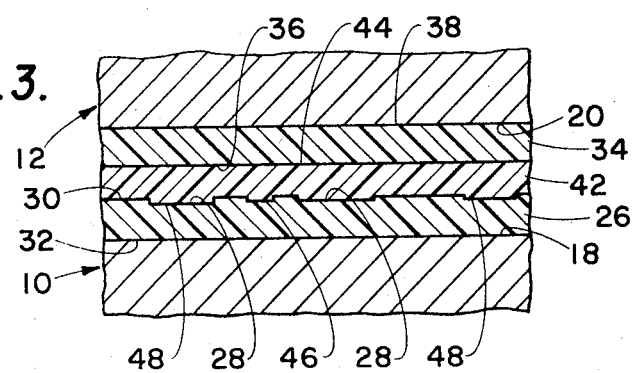
FIG. 3 is an enlarged, fragmentary sectional view looking in the direction of the arrows 3—3 in FIG. 2.

Referring to the drawing, an embodiment of plastic printing plate mold construction incorporating the principles of the present invention is shown as including lower and upper mold halves generally indicated at 10 and 12, respectively, the mold halves being formed primarily of metal and broadly forming a usual pressure-type mold well known to those skilled in the mold art. Furthermore, the mold halves 10 and 12 are mounted for separation as illustrated in FIG. 1 and closure as illustrated in FIG. 2 being mounted for such separation and closure in usual mold apparatue (not shown), also well known. Both the lower and upper mold halves 10 and 12 include a series of cooling fluid openings 14 and 16 therethrough, respectively, for the controlled flow of a cooling medium, such as water, to provide equal cooling for the lower and upper mold halves when required, each of the cooling fluid openings 14 being equally spaced from and giving even cooling to a flat upwardly facing molding surface 18 of the lower mold half and the cooling fluid openings 16 being similarly positioned and giving even cooling to a flat, downwardly facing molding surface of the upper mold half.

More particularly to the lower mold half 10, a pair of inverted L-shaped, tranversely extending matrix clamping bars 22 are mounted at opposite longitudinal ends of the molding surface 18 and have upper portions overlying the longitudinal extremities of said molding surface. The matrix clamping bars 22 are vertically removable from the lower mold half 10 and are normally retained in clamping position as shown, as well as properly located in such clamping position, by a series of releasable locating pins 24. Thus, with the lower and upper mold halves 10 and 12 separated as shown in FIG. 1, the matrix clamping bars 22 may be inserted and moved downwardly within the lower mold half to the clamping position shown overlying and clamping a sheet-like plastic matrix 26 against the flat molding surface 18 by overlying and downwardly clamping longitudinal extremities of such plastic matrix and when the molding usefulness of the plastic matrix has been expended, the same can be released and replaced merely by a release and repositioning of the matrix clamping bars 22.

The plastic matrix 26 as stated is generally sheet-like in configuration and forms the prime molding surface for the mold construction having the reverse of desired printing characters 28, such as letters or numbers or pictorial representations or any other characters desired, on an upwardly facing molding surface 30, a back surface 32 thereof being flat and lying flatwise against the upwardly facing flat molding surface 18 of the lower mold half 10. Also, the plastic matrix 26 is formed of a relatively high temperature plastic, such as polysulfone, and being plastic has a rate of heat transfer much less than the higher rate of heat transfer of the lower and uppermold halves 10 and 12 formed of metal so that the plastic matrix forms an insulation barrier over the lower mold half retarding the flow of heat downwardly into the lower mold half from the plastic matrix molding surface 30. Such plastic matrices may be formed in any number required by use of metal plates formed of relatively soft metals and in the usual manner.

Important to the principles of the present invention is a thermal baffle 34 positioned on the flat molding surface 20 of the upper mold half 12 extending longitudinally and transversely throughout the upper mold half molding surface. The thermal baffle 34 preferably includes a flat molding surface 36 downwardly facing the flat molding surface 18 of the lower mold half 10 and more important, the molding surface 30 of the plastic matrix 26, the thermal baffle tightly abutting the flat molding surface 20 of the upper mold half 12 with a flat back surface 38. Thus, the thermal baffle 34 is preferably of uniform thickness throughout and is coextensive with the molding surface 30 of the plastic matrix 26, that is, the preferably flat or planar molding surface 36 of the baffle is of the same size and shape as the plastic matrix molding surface and is positioned in the upper mold half so that where the mold is closed, the baffle covers the entire matrix.

Still further, the thermal baffle 34 is preferably formed of the same plastic as the plastic matrix 26, for instance, polysulfone so that the plastic material of the thermal baffle has the same rate of heat transfer as the plastic material of the plastic matrix. In such case, and in view of the plastic matrix 26 having the reverse printing characters 28 on the molding 30 thereof so as to vary in thickness over the plastic matrix extent, for optimum results, the thermal baffle preferably uniform thickness is preferably equal to the average thickness of the plastic matrix. As a result, the average rate of heat transfer through the baffle 34 into the upper mold half 12 is approximately the same as the rate of heat transfer through the plastic matrix 26 downwardly into the lower mold half 10, each of the thermal baffle and the plastic matrix being formed of the relatively high temperature plastic.

In considering the broader aspects of the present invention, however, it should be kept in mind that what is being sought is the provision of a thermal baffle, such as the thermal baffle 34, on the upper mold half 12 which will retard the rate of heat transfer into the upper mold half so that the rate of heat transfer from the thermal baffle molding surface, in this case molding surface 36, will be an approximate average of the rate of heat transfer from the molding surface of the plastic or other material matrix, in this case the molding surface 30 of the plastic matrix 26, into the lower mold half 10. Thus, if the material of the thermal baffle 34 is different from that of the plastic matrix 26, and the material of the thermal baffle has a different rate of heat transfer than the material of the plastic or other material matrix, the thickness of the thermal baffle, for optimum results, would have to be different or in a different proportion to the average thickness of the matrix. For convenience, however, by forming both the thermal baffle 34 and the matrix 26 of the same plastic material, the thermal baffle, for optimum results, would have a uniform thickness approximately equal to the average thickness of the plastic matrix.

Completing the construction of the upper mold half 12 and the thermal baffle 34, the thermal baffle is preferably adhesively secured to the flat molding surface 20 of the upper mold half 12 by use of a relatively high temperature resistant adhesive in view of the fact that the thermal baffle is relatively permanent as compared to the frequent changing of the plastic matrix 26 on the lower mold half 10 in order to retain the matrix reverse printing characters 28 on the molding surface 30 thereof sufficiently sharp to produced the desired plastic printing plates. Also, the upper mold half 12 includes the transversely extending, spring urged closure bars 40 at the longitudinal extremities of the thermal baffle 34 upwardly aligned with the matrix clamping bars 22 on the lower mold half 10. Thus, as shown by comparison of FIGS. 1 and 2, when the lower and upper mold halves 10 and 12 are brought together, the closure bars 40 of the upper mold half 12 will downwardly engage the matrix clamping bars 22 of the lower mold half 10 and such closure bars will be forced to retract upwardly against the spring urging thereof into the upper mold half while tightly abutting the matrix clamping bars in full closure of the mold halves.

In use of the plastic printing plate mold construction illustrating the principles of the presnt invention, the lower and upper mold halves 10 and 12 are separated as shown in FIG. 1 and a proper sized slug of hot fluid plastic, preferably polypropylene which is of a lower fluid temperature than the polysulfone of the plastic matrix 26 and the thermal baffle 34, is inserted between the mold halves and positioned on the plastic matrix. The mold halves 10 and 12 are then closed to the position shown in FIG. 2 and at this time, as well as at all other times, the mold halves are free of heating other than the heat of molding generated from the plastic slug placed therebetween. Upon the closure of the mold halves 10 and 12, the pressure of closure forces the hot fluid plastic of the plastic slug longitudinally and transversely throughout the opposite plastic matrix molding surface 30 and thermal baffle molding surface 36, both the plastic matrix 26 and the thermal baffle 34 constituting heat flow retardants so as to retain the heat of molding of the hot fluid plastic slug therein permitting the plastic of the plastic slug to remain fluid and distributt throughout the plastic matrix molding surface. After such complete distribution takes place, a cooling fluid, such as water, is simultaneously directed through the cooling fluid openings 14 and 16 of the mold halves 10 and 12 at a rate providing even cooling for the mold halves and with the rate of heat transfer through the opposite plastic matrix 26 and the thermal baffle 34 into the mold halves averaging approximately the same or equal, the hot fluid plastic will be cooled to a solidified self-supporting form approximately equal from each of the upper and lower sides thereof finally producing a finished plastic printing plate 42 having a flat back or upper surface 44 formed by the thermal baffle molding surface 36 and a front or lower molded surface 46 containing the desired finished printing characters 48.

The finished plastic printing plate 42 is then removed from the mold construction in the usual manner by separating the mold halves 10 and 12 as shown in FIG. 1, the flow of cooling fluid through the cooling fluid opening 14 and 16 of the mold halves at this time being terminated. The mold halves 10 and 12 are then ready for the insertion therebetween of another slug of hot fluid plastic for a repeat of the same molding process and the production of another plastic printing plate. Furthermore, the plastic printing plates 42 so produced may be conventionally used in usual printing plate processes for producing high quality printing.

As an example and to aid one skilled in the art of practicing the present invention, with the matrix 26 and the thermal baffle 34 both formed of the same plastic, such as polysulfone, and the plastic printing plates 42 formed of polypropylene, the plastic matrix may be in the order of 0.045 to 0.070 inch thickness and the thermal baffle in the order of 0.050 inch thickness, with the finished plastic printing plate being in the order of from 0.025 to 0.075 inch thickness. The polypropylene hot fluid plastic slug at the time of insertion between the mold halves 10 and 12 may be in the order of 475° Fahrenheit.

According to the principles of the present invention, therefore, a mold construction is provided wherein plastic articles and the like such as high quality plastic printing plates may be produced at a much higher production rate than has heretofore been possible while requiring far less criticle heat dissipation or cooling rate control of the molds during the molding processes. The thermal baffle 34 being applied to the upper mold half 12 opposing the plastic or other material matrix 26 mounted on the lower half 10 insures an equalized rate of heat transfer through the respective thermal baffle and plastic matrix into the mold halves so that the rate of heat dissipation from the slug of hot fluid plastic ultimately forming the plastic printing plates 42 is substantially equal in both mold half directions until the plastic of the plastic printing plates is sufficiently cool for rigid solidification of the plastic printing plates. This, thereby, eliminates any problems of final plastic printing plate distortion which could affect the quality of printing obtained in use of the plastic printing plates and insures the printing in the use of the plastic printing plates of maximum quality.

In addition, and according to the principles of the present invention, even a higher resolution and fidelity of printing plate character can be produced in the final plastic printing plates 42 than has been possible with prior similar plastic printing plates for the reason that the opposite heat flow retardants as constituted by the plastic matrix 26 and the thermal baffle 34 into the lower and upper mold halves 10 and 12 permits the charge of hot fluid plastic inserted in the mold and forming the final printing plates 42 a greater period of time in its original hot fluid state to flow completely throughout the molding surfaces. After such desired flow has been completed, and only at this time, is it necessary to cool the mold halves 10 and 12. In this manner, absolute control can be accomplished resulting in the final plastic printing plates 42 having printing characters 48 of maximum quality.

Still additionally, according to the unique principles of the present invention, plastic printing plates 42 can be produced at a higher production rate while still maintaining the increased quality described. With the complete control of heat flow of the heat of molding and the dissipation thereof only at the exact moment desired, it is unecessary to originally heat during each plastic printing plate molding the mold halves 10 and 12, but rather such mold halves are completely free of heating other than that received from the heat of molding and it is only necessary to cool the same for final plastic printing solidification, thus thereby appreciably decreasing the over-all molding cycle and reducing plastic printing plate production time. Still with all of the foregoing advantages, the plastic printing plate mold construction of the present invention is completely versatile and is preferably adaptable to either pressure or injection molding.

Although the construction principles of the present invention have been illustrated herein specifically apply to the molding of plastic printing plates, it should be understood that such molding construction principles can be applied equally as well to the molding of other articles of similar material and wherein the same difficulties exist. Thus, it is intended that the basic prin-

I claim:

1. In a mold construction of the type for use in molding articles such as plastic printing plates from hot fluid plastic, the combination of separable metal mold halves, a matrix on one of said mold halves having a molding surface facing the other of said mold halves, said matrix having an average rate of heat transfer markedly less than the rate of heat transfer of said mold halves, and a thermal baffle on the other of said mold halves having a molding surface facing the molding surface of said matrix, said baffle molding surface having the same area and peripheral shape as the matrix and being positioned on the upper mold half so that when the mold is closed, the baffle covers the entire matrix, said baffle having a uniform thickness throughout and the entire molding surface of said baffle facing said matrix being planar, said baffle being made of a material which has an average rate of heat transfer throughout approximately equal to the average rate of heat transfer of said matrix.

2. A mold construction as defined in claim 1 in which said mold halves are free of heating means other than heat of molding received through said matrix and thermal baffle and include cooling means for dissipating said heat of molding received through said matrix and thermal baffle.

3. A mold construction as defined in claim 1 in which said matrix is selectively removably secured to said one of said mold halves by clamping means normally retaining said matrix on said one of said mold halves and selectively operable for removing and replacing said matrix on said one of said mold halves.

4. A mold construction as defined in claim 1 in which said thermal baffle is adhesively secured to said other of said mold halves.

5. A mold construction in accordance with claim 1 in which the baffle is formed of plastic material.

6. A mold construction in accordance with claim 5 in which the matrix is formed of plastic material.

7. A mold construction in accordance with claim 6 in which the matrix and baffle are formed of the same plastic material.

8. A mold construction in accordance with claim 1 in which the matrix and baffle have approximately the same average thickness throughout and are made of materials having approximately the same rate of heat transfer.

9. A mold construction in accordance with claim 1 in which the mold halves are free of heating means other than the heat of molding from the article undergoing molding.

10. A mold construction in accordance with claim 8 in which the mold halves include cooling means for dissipating the heat of molding received through said matrix and said thermal baffle.

* * * * *